United States Patent Office 3,814,820
Patented June 4, 1974

---

3,814,820
FRUIT AND VEGETABLE CONTACT WITH CHLORINE CONTAINING BIOCIDES AND DISCOLORATION INHIBITORS
Francis F. Busta, St. Paul, and Irving M. Brooks, Golden Valley, Minn., assignors to Salad Supreme Incorporated, Minneapolis, Minn.
No Drawing. Filed Dec. 2, 1969, Ser. No. 881,578
Int. Cl. A23l 3/00
U.S. Cl. 426—262         12 Claims

ABSTRACT OF THE DISCLOSURE

The process of treating lettuce and other salad ingredients to extend or prolong their quality and reduce microbiological contamination. Dismembered lettuce (i.e. sliced, chopped or otherwise fractured) is treated under controlled conditions as follows:

(1) Washed in a cleansing solution;
(2) Rinsed in potable water;
(3) Contacted with an aqueous sanitizing agent (e.g. sodium hypochlorite);
(4) Optionally rinsed again in potable water;
(5) Contacted with a discoloration inhibitor in the optional presence of a chelating agent; and
(6) Extracted of excess discoloration inhibitor.

BACKGROUND OF THE INVENTION

In the past, various methods have been proposed for the treatment of certain fruits and vegetables (e.g. potatoes) to prevent discoloration. In this respect, see U.S. 2,506,793 which issued on May 9, 1950 to Arthur F. Kalmar et al. and U.S. 2,628,905 which issued on Feb. 17, 1953 to Lloyd L. Antle et al. Similarly, various techniques are known in the art for reducing fungicidal activity on certain vegetables (e.g. see again U.S. 2,506,93).

However, lettuce, whether processed alone or in admixture with other salad ingredients (i.e. vegetables and fruits) poses special problems to food processors. After lettuce has been sliced, chopped, fractured or otherwise dismembered it is or becomes quite sensitive to treatment and it is difficult to process such dismembered lettuce without undesirably modifying the natural or fresh appearance, flavor, texture or cell structure of the lettuce.

Although various methods have been suggested for use in the processing or treatment of fruits and vegetables including lettuce, no single process of which we are aware can be successfully applied on a commercial scale to dismembered lettuce to inactivate or inhibit pathogenic microorganisms (e.g. salmonellae staphylococci, and *Escherichia coli*), to inactivate or inhibit microorganisms that contribute to the spoilage of the lettuce, and also retard discoloration and slime formation.

The lack of an effective treating process is a serious disadvantage to those engaged in the preparation of prepared salads or salad-forming ingredients for subsequent sale and use by industrial and institutional food service operations (e.g. hospitals, restaurants and schools), and for resale by retail food outlets (e.g. supermarkets).

SUMMARY OF THE INVENTION

The present invention is a process which is effective in the treatment of dismembered lettuce. The process will reduce microbial populations, retard discoloration and slime formation, and otherwise extend the quality of dismembered lettuce. Although this process is distinctively different from prior art processes in that it is effective with dismembered lettuce, it can be used in the treatment of other salad ingredients (i.e. fruits and vegetables).

Briefly described, the process of this invention as applied to lettuce is as follows:

(1) Lettuce is washed in a cleansing solution;
(2) Rinsed in potable water;
(3) Contacted with an aqueous sanitizing agent (e.g. sodium hypochlorite);
(4) Optionally rinsed again in potable water;
(5) Contacted with a discoloration inhibitor in the optional presence of a chelating agent;
(6) Extracted of excess discoloration inhibitor.

DETAILED DESCRIPTION

The process of the present invention is a combination process which permits one to treat lettuce and other salad-forming ingredients (separately or in admixture with each other) to thereby produce edible products which maintain their high quality and which meet the increasingly rigid health standards of various institutional food service buyers (e.g. hospitals, restaurants, schools and retail outlets).

In treating fruits and vegetables, particularly, lettuce, it is important for the temperature of the product being treated to be lowered and maintained at a low temperature to achieve optimum quality and maximal shelf life. Accordingly, it is desirable for the various processing steps set forth herein to operate at temperatures whereby the cumulative effect is to lower the temperature of the product being treated. For lettuce, a particularly desirable final temperature is as close to 32° F. as possible without freezing.

Producs to be treated

Lettuce is the primary product to be treated in the process of this invention. The lettuce can be treated alone, or in admixture with other vegetables. However, the process of this invention can be applied to other vegetables and to fruits. Typical products which can be treated (other than lettuce) include radishes, celery, celery or chinese cabbage, carrots, endive or chicory, romaine, escarole, red cabbage, parsely, cherry tomatoes, cauliflower, green peppers, and the like. The various products can be treated whole, sliced, chopped, fractured or otherwise dismembered with the choice of form (e.g. sliced or whole) depending in a large measure upon the type of product and the desired end use. For example, lettuce is preferably treated in a dismembered state while cherry tomatoes are preferably treated whole.

Step 1 (cleaning)

In the first step of this process, the product is washed in a cleansing solution, usually an aqueous solution or in dispersion of a suitable detergent or other surface active agent. Phosphate (sodium tripolyphosphate) and sulphate (sodium lauryl sulphate) detergents are well suited for this purpose. Suitable detergents and other cleansing aids are commercially available. The temperature of the washing or cleansing solution should be between 32° F. and 70° F. preferably from 40° F. to 60° F. The time of treatment with the cleansing solution can vary, although times of from 15 seconds to 1 minute, especially 20–40 seconds, being preferred. The pH of the washing solution should be within the range of 5.5 to 9.5 with pH's from 7 to 9.5 being preferred. A particularly preferred level of pH is from 8–9.

Although the amount of detergent or other cleaning agent used to form this solution may vary widely depending upon the type of detergent or cleansing agent, levels of from 0.005 to 0.40 grams per 100 ml. of water are often adequate. Suitable pH levels can be obtained or maintained by the use of suitable buffering agents as known in the art.

Step 2 (rinsing)

This step is essential to the practice of this invention. We have found that prompt rinsing of the products being processed to remove the cleansing solution of Step 1 must be done if one wishes to retain the quality of the lettuce or other product being treated. The rinsing solution is any potable water. The temperature of the rinse water can range from 32° F. up to 45° F., with the lower temperatures being preferred. It is useful if the rinse water is cold (e.g. 32° F.–37° F.) so that cooling and rinsing are affected at the same time.

Step 3 (sanitizing)

In the third step, the products being treated are contacted with an aqueous solution of a suitable sanitizing agent to thereby reduce the microbial population of the product to a desired level. Sanitizing agents of the chlorine species are preferred (e.g. hypochlorites and chlorine dioxide). Hydrogen peroxide is effective, but requires the use of a secondary treatment.

The temperature of the sanitizing solution should be within the range of 32° F. to 45° F., with the preferred temperature being within the range of 32° F. to 37° F.

Step 4 (optional rinsing)

In this step, which is optional but preferred, the product is again rinsed with a potable water. This rinsing can serve to further cool the product and removes residual sanitizing agents. Rinsing is desirable if high levels of chlorine-releasing sanitizing agents have been used in Step 3 since high chlorine levels sometimes cause cell damage of lettuce and other products. Temperatures within the range of 32° to 45° F., preferably 32° to 37° F. are useful during this step.

Step 5 (inhibiting discoloration)

In this step, the products being treated are contacted with a solution of a suitable discoloration inhibitor. Suitable inhibitors and techniques for their application are known to those skilled in the art and include materials which are effective in reducing enzymatic browning and other color producing actions. See, for example, U.S. 2,628,905.

The pH during this step should be within the range of 3.5–9.5, preferably from 5.8 to 6.5. A particularly useful group of discoloration inhibitors are ascorbic acid and those producing sulphur dioxide (e.g. sodium bisulfite). The temperature of treatment to inhibit discoloration should again be within the range of 32°–45° F., with temperatures in the range of 32° to 37° F. being particularly preferred.

The effectiveness of this step of the process can be enhanced by the additional use of chelating agents. Suitable chelating agents include those which effectively remove divalent cations such as copper from solution. Such divalent cations catalyze color-producing reactions if they are not removed. Suitable chelating agents include calcium disodium ethylene diaminetetraacetic acid, citric acid and certain pyrophosphates.

Step 6 (extraction)

In this step, the products from Step 5 are processed to extract or otherwise remove excess solution of the discoloration inhibitor. Various methods of extraction can be used. One useful technique is to place the product being processed (e.g. lettuce) in a supported position (e.g. on a grill, mesh or other support) to permit draining and thereafter basket centrifuging the product to remove additional inhibitor solution.

After the processing has been completed, the lettuce, alone or in admixture with other salad forming ingredients, should be stored at or near its optimum storage temperature. For lettuce, the optimum storage temperature is as close to 32° F. as is possible without freezing the lettuce.

The present invention will be further understood by reference to the following specific examples. Unless otherwise indicated, all parts and percentages are by weight.

EXAMPLE I

Head lettuce at about 60° F. was uncrated, a few of the outer leaves on each head were removed and discarded, the heads then cored, and finally chopped to salad size pieces. The dismembered lettuce was then placed in a mesh container which was processed according to the following sequence:

(1) Dipped into an aqueous solution of a mixed condensed phosphate/sulphate detergent (a product of SEP-KO Chemicals, Inc. of Minneapolis, Minnesota) for 30 seconds. The wash solution contained 0.2 grams of powdered detergent per 100 ml. of water. The water temperature was 60° F. and the pH of the wash solution was 8.5.

(2) After 30 seconds of washing, the container filled with dismembered lettuce was removed from the cleansing solution and immediately rinsed in tap water at 35° F.

(3) The container of dismembered lettuce was then dipped for 30 seconds into an aqueous solution of sodium hypochlorite at 35° F. The concentration of sodium hypochlorite was sufficient to provide 25 p.p.m. chlorine.

(4) Next, the dismembered lettuce was immediately rinsed with tap water at 35° F.

(5) The lettuce was then dipped into an aqueous solution of sodium bisulfite at 35° F. for 30 seconds. The solution was prepared from a commercially available vegetable treating product (Vege-Fresh, a product of Universal Foods of Milwaukee, Wis.) which contained appropriate buffers to give a pH of 5.8 when used at a level of 0.5 grams of product per 100 ml. of water. In addition to the sodium bisulfite, the solution contained tetrasodium pyrophosphate and sodium acid pyrophosphate.

(6) After 30 seconds exposure to the solution of Step 5, the container of dismembered lettuce was removed and suspended to permit draining for approximately 2–3 minutes. Thereafter, the lettuce was centrifuged in a basket centrifuge to further remove solution from Step 5.

(7) The product of Step 6 was then stored just above 32° F. prior to being mixed with other salad-forming ingredients and packaged as a prepared salad.

The resulting product (i.e. treated lettuce) was found to be of improved quality when compared to other lettuce prepared by conventional processes. Discoloration and slime formation were reduced and the fresh appearance, flavor, texture, and cell structure of the lettuce were retained at a high level for a longer period of time as contrasted to lettuce treated according to conventional processes. Laboratory analysis for pathogenic organisms (e.g. salmonellae and staphylococci) were negative and the products met current health standards of some institutional users of such products (e.g. hospitals and schools), and the standards of public health agencies monitoring retail products.

What is claimed is:

1. A process of treating a product selected from the group consisting of vegetables and fruits, which comprises the steps of:
   (a) washing a product to be treated in an aqueous cleaning solution at a temperature of from 32°–70° F.;
   (b) promptly rinsing washed product of step (a) with potable water;
   (c) contacting the rinsed product of step (b) with an aqueous sanitizing solution to thereby inactivate unwanted micro-organisms, said sanitizing solution comprising a chlorine-containing sanitizer selected from the group consisting of hypochlorites and chlorine dioxide;
   (d) contacting sanitized product of step (c) with a solution of a discoloration inhibitor selected from the group consisting of ascorbic acid and sulfur dioxide-producing discoloration inhibitors; and (e) removing excess solution of step (d) from said product.

2. Processes of claim 1 wherein the aqueous cleaning solution of step (a) has a pH of 5.5–9.5.

3. Processes of claim 2 wherein the water of step (b) has a temperature of 32°–45° F.

4. Processes of claim 3 wherein sanitized product from step (c) is rinsed with potable water prior to step (d).

5. Processes of claim 4 wherein the solution of the discoloration inhibitor has a pH of at least 5.8 and contains sodium bisulfite.

6. Processes of claim 5 wherein said product is dismembered lettuce.

7. A process of treating lettuce which comprises the steps of:
(a) washing dismembered lettuce in an aqueous cleansing solution at a pH of 8–9 and a temperature of from 32°–70° F. for from 15 seconds to one minute;
(b) promptly rinsing washed lettuce of step (a) with potable water at a temperature of from 32°–45° F.;
(c) contacting rinsed lettuce of step (b) with a sanitizing solution at a temperature of from 32°–45° F., said solution comprising a sanitizer selected from the group consisting of hypochlorites and chlorine dioxide;
(d) rinsing sanitized lettuce from step (c) with potable water at a temperature of from 32°–45° F.;
(e) contacting rinsed lettuce from step (d) with a solution of a discoloration inhibitor at a pH of 5.8–6.5 and a temperature of from 32°–45° F., said discoloration inhibitor being selected from the group consisting of ascorbic acid and sulfur dioxide-producing discoloration inhibitors; and
(f) removing excess inhibitor solution from the lettuce of step (e).

8. Processes of claim 7 wherein the sanitizing solution of step (c) contains sodium hypochlorite.

9. Processes of claim 8 wherein the solution of the discoloration inhibitor contains sodium bisulfite.

10. Processes of claim 9 wherein said solution of the discoloration inhibitor also contains a chelating agent.

11. Processes of claim 10 wherein lettuce, only, is treated.

12. Processes of claim 10 wherein lettuce is treated in admixture with other salad forming ingredients.

References Cited

UNITED STATES PATENTS

| | | | |
|---|---|---|---|
| 1,967,074 | 10/1931 | Baker | 99—154 |
| 2,894,843 | 7/1959 | Malecki | 99—103 |
| 2,332,151 | 10/1943 | Kalmar | 99—103 |
| 2,082,573 | 6/1937 | Hall | 99—103 |
| 2,532,489 | 12/1950 | Ferguson | 99—224 |
| 3,013,885 | 12/1961 | Overbeek | 99—224 |
| 3,126,287 | 3/1964 | Finkle | 99—224 |

FOREIGN PATENTS

| | | | |
|---|---|---|---|
| 536,268 | 1/1957 | Canada | 99—154 |

NORMAN YUDKOFF, Primary Examiner

H. H. BERNSTEIN, Assistant Examiner

U.S. Cl. X.R.

426—268, 270, 286, 335